United States Patent [19]

Hartford

[11] 4,242,728
[45] Dec. 30, 1980

[54] INPUT/OUTPUT ELECTRONIC FOR MICROPROCESSOR-BASED ENGINE CONTROL SYSTEM

[75] Inventor: Thomas W. Hartford, Livonia, Mich.
[73] Assignee: The Bendix Corporation, Southfield, Mich.
[21] Appl. No.: 881,323
[22] Filed: Feb. 27, 1978
[51] Int. Cl.³ .................... F02D 21/04; F02M 25/06; G06F 7/70
[52] U.S. Cl. ................... 364/431; 123/480; 123/568; 371/14
[58] Field of Search ........ 364/424, 431, 442; 123/32 EB, 32 EH, 119 A; 235/92 T, 92 SH; 340/347 AD, 347 CC

[56] References Cited

U.S. PATENT DOCUMENTS

| | | | |
|---|---|---|---|
| 3,798,428 | 3/1974 | Izawa | 235/92 SH |
| 3,829,664 | 8/1974 | Kashio | 235/92 SH |
| 3,906,207 | 9/1975 | Rivere et al. | 123/32 EA |
| 3,961,325 | 6/1976 | Kendall et al. | 340/347 CC |
| 4,099,495 | 7/1978 | Kiencke et al. | 123/32 EB |
| 4,140,896 | 2/1979 | Robertson | 235/92 T |
| 4,161,929 | 7/1979 | Nohira et al. | 123/119 A |
| 4,164,032 | 8/1979 | Nohira et al. | 123/119 A X |
| 4,164,206 | 8/1979 | Toelle | 123/119 A |
| 4,173,205 | 11/1979 | Toelle | 123/119 A |

Primary Examiner—Felix D. Gruber
Attorney, Agent, or Firm—Gaylord P. Haas, Jr.; Russel C. Wells

[57] ABSTRACT

A method and apparatus for controlling the various functions of an internal combustion engine using a program controlled microprocessor having a memory preprogrammed with various control laws and associated control schedules receives information relating to one or more actual engine operating parameters such as manifold absolute pressure, throttle position, engine coolant temperature, air temperature, engine speed or period or the like. These parameters are sensed and then supplied to input circuits for signal conditioning and conversion to digital words usable by the microprocessor. The microprocessor system computes one or more digital words indicative of particular computer-commanded engine control operations and output circuitry responds to predetermined computer-generated commands and to the computed digital command words for generating corresponding pulse-width control signals for controlling such engine operations as fuel-injection, ignition timing, proportional and/or on-off EGR control, and the like. A fuel management control "limp home" circuit is also disclosed which will allow a vehicle to be driven for a short distance such as to a repair station or the like whenever the microprocessor-controlled fuel injection system fails to function properly.

10 Claims, 1 Drawing Figure

Microprocessor-Based
Electronic Engine Control System

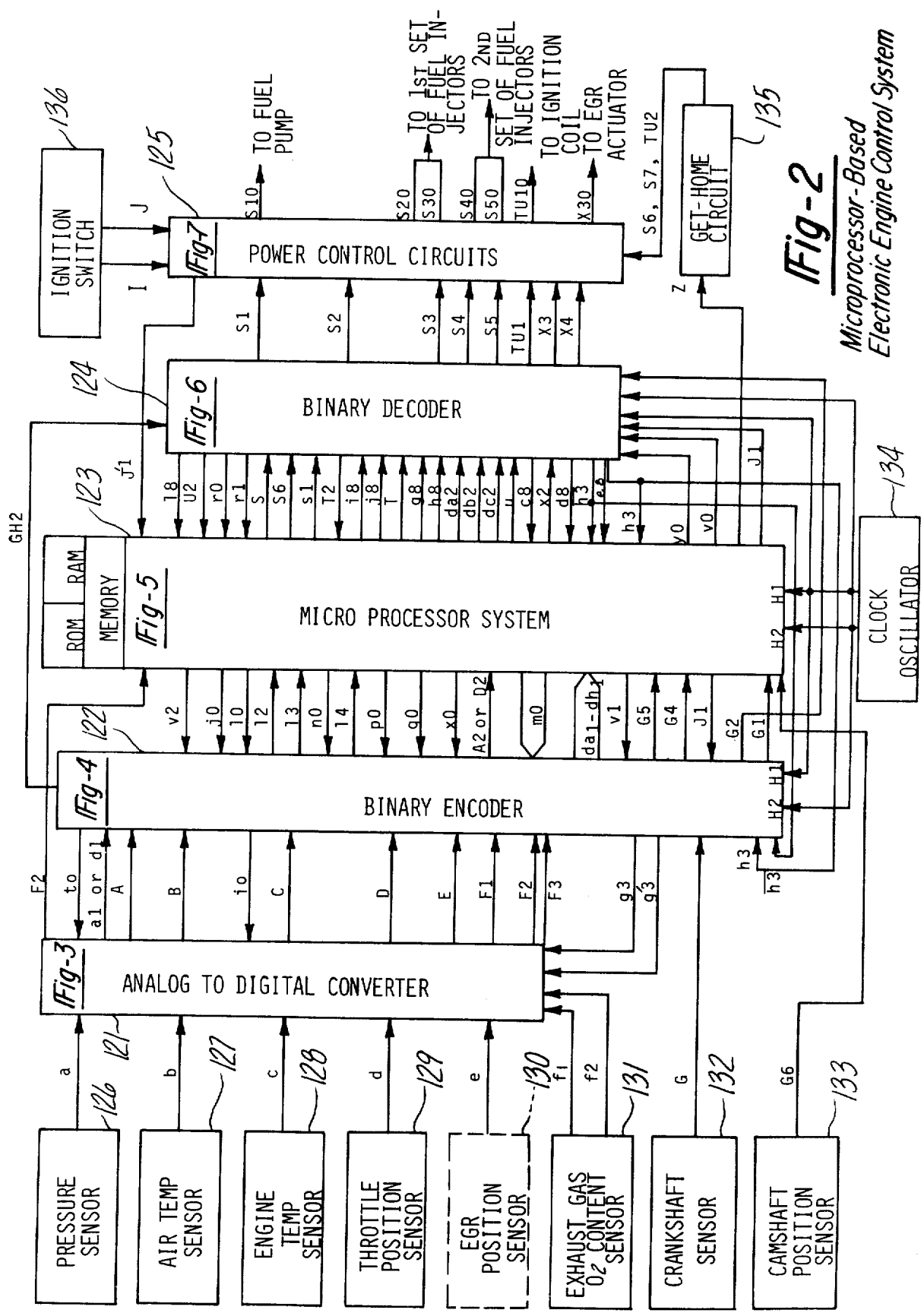

INPUT/OUTPUT ELECTRONIC FOR MICROPROCESSOR-BASED ENGINE CONTROL SYSTEM

BACKGROUND OF THE INVENTION

1. Field of the Invention

This invention relates generally to a method and apparatus for controlling an internal combustion engine and more particularly to a microprocessor-based electronic engine control system having a memory preprogrammed with various control laws and control schedules responsive to one or more sensed engine-operating parameters for generating engine control signals for effecting fuel injection, ignition timing, EGR control, and the like.

2. Statement of the Prior Art

Many of the patents of the prior art recognize the need for employing the enhanced accuracy of digital control sytems for more accurately controlling one or more functions of an internal combustion engine.

U.S. Pat. No. 3,969,614 which issued to David F. Moyer, et al on July 13, 1976 is typical of such systems as are: U.S. Pat. No. 3,835,819 which issued to Robert L. Anderson, Jr. on Sept. 17, 1974; U.S. Pat. No. 3,904,856 which issued to Louis Monptit on Sept. 9, 1975; and U.S. Pat. No. 3,906,207 which issued to Jean-Pierre Rivere, et al on Sept. 16, 1975. All of these Patents represent a break-away from the purely analog control systems of the past, but neither the accuracy, reliability, or number of functions controlled is sufficient to meet present day requirements for combined fuel economy, pollution control and drivability.

Future internal combustion engines will require that emissions be tightly controlled due to ever more-stringent governmental regulation, while fuel consumption is minimized and drivability improved over the entire operating range of the engine. None of the systems of the prior art provide a method and apparatus for controlling the operation of an internal combustion engine with sufficient accuracy to attain, in combination, minimal emissions and minimal fuel consumption together with improved drivability.

The systems of the prior art attempted to control one or more of the engine operating functions but none attempts to control the operation of the fuel pump, fuel injection, engine ignition timing, on-off and/or proportional EGR control, and the like while using feedback from such devices as oxygen sensors for emission control purposes or for effecting a closed loop fuel control operation, and yet including provisions for optimizing acceleration enrichment handling, and the like. Moreover, the systems of the prior art are extremely expensive, difficult to repair and maintain and are, therefore, not commercially feasible at the present time.

These and other problems of the prior art are solved by the microprocessor-based electronic engine control system of the present invention which eliminates most or all of the problems of the prior art and enables a commercially feasible implementation of a digital control system having a relatively low cost and which is easy to repair and maintain. The system of the present invention is able to implement much more advanced and complex fuel control laws and expand various control functions performed thereby to include ignition timing and on-off and/or proportional EGR control while, at the same time, reducing the cost and size of the unit and increasing reliability so as to render the system commercially feasible.

These and other objects and advantages of the present invention will be accomplished by the present method and apparatus for the electronic engine control of nearly all engine functions while simultaneously providing many safety features together with increased accuracy and ease of adaption to the internal combustion engines of most, if not all, modern vehicles.

SUMMARY OF THE INVENTION

Various input/output circuitry is disclosed for implementing the microprocessor-based electronic engine control system described herein, the various important aspects of the improved input/output electronics include:

(1) a pulse-width to binary converter means timed shared via a multiplexer among several different and discreet analog sensors;

(2) a command signal generator means for enabling the engine I/O electronics to be controlled directly by the address signals on the microprocessor address but to increase communications speeds;

(3) a secondary command signal generator means in which additional I/O control signals are obtained by use of the microprocessor address bus state in combination with a data bus word to provide additional I/O control information thereby greatly reducing the number of memory addresses reserved for the memory-mapped I/O and reducing the number of communication lines to the I/O electronics;

(4) interrupt control logic means;

(5) a parallel-to-serial output word converter means which is time-shared with all output pulse-widths in which the contents are routed to the correct counter via a control word provided by the computer program to a pretermined register;

(6) a binary decoder means including fuel a injection pulse-width generating circuit to convert binary words into a pulse-width output by utilizing a serial shift register and half adder circuit to implement a binary counter function, in which fuel injection is initiated by computer program command, and in which the fuel-width is provided to a resolution of eight microseconds even through the counter increments are in sixteen microsecond intervals, and in which a computer interrupt is provided at the end of the fuel injection pulse so as to improve the dynamic response in certain operating modes;

(7) means for computing ignition dwell and timing control by two programmable counters from binary words and synchronized to an engine event, such as crankshaft position or the like, in which the counters are serial dynamic shift registers and half adder (subtractor) circuits for implementing same in the manner of a binary counter, wherein one counter is started by the occurrence of an engine event (to set a computer-calculated delay time) while the second counter is started by the end of the counting of the first counter and whose count is controlled by computer-calculated time interval to provide the required time for initiating ignition, and wherein the second counter may start counting (i.e. the ignition begins before the calculated delay time has elapsed) on the next subsequent engine event while the other counter is still counting during acceleration, while in a "cranking" mode of operation, or the like; and (8) proportional control of EGR via a pulse width-modulated output via a counter whose stored count is preprogrammed and initiated by computer command.

Another aspect of the invention relates to a fuel management control "limp home" circuit which will allow a vehicle to be driven a short distance in the event that the fuel injection controller fails to function or the like in order to prevent engine fires.

INCORPORATION BY REFERENCE

This application is one of fourteen applications filed on Feb. 27, 1978, all commonly assigned and having substantially the same specification and drawings, the fourteen applications being identified below:

| Serial Number | Title |
|---|---|
| 881,321 | Microprocessor-Based Electronic Engine Control System |
| 881,322 | Feedback-Compensated Ramp-Type Analog to Digital Converter |
| 881,323 | Input/Output Electronic For Microprocessor-Based Engine Control System |
| 881,324 | Switching Control of Solenoid Current in Fuel Injection Systems |
| 881,921 | Dual Voltage Regulator With Low Voltage Shutdown |
| 881,922 | Shutdown Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for Internal Combustion Engine Control |
| 881,982 | Improvements in Electronic Engine Controls System |
| 881,983 | Electronic Fuel Injection Compensation |
| 881,984 | Ingition Limp Home Circuit For Electronic Engine Control Systems |
| 881,985 | Oxygen Sensor Signal Conditioner |

Application Ser. No. 881,321, has been printed in its entirely, including FIGS. 1 to 10.34 and the specification of that application is specifically incorporated by reference.

BRIEF DESCRIPTION OF THE DRAWINGS

FIG. 2 is a block diagram of the microprocessor-based electronic engine control system.

I claim:

1. A microprocessor-based electronic engine control system responsive to one or more engine-operating parameters for generating one or more control commands for operating such engine functions as fuel injection, ignition timing, and proportional EGR control, said system including an engine having an intake system, an exhaust system, conduit means for operatively connecting said exhaust system to said intake system for recirculating exhaust gases back to said intake system to modify the air-fuel ratios existing therein, an EGR valve disposed at least partially within said conduit means and responsive to an EGR control signal for selectively increasing and decreasing the quantity of exhaust gases recirculated back to said intake system, said electronic engine control system further including a microprocessor, memory means operatively associated with said microprocessor, means for sensing the actual relative position of said EGR valve and generating a digital word indicative thereof, the improvement comprising memory means storing data representative of a look-up table of modifier values which are a function of at least EGR valve positions stored in said memory means and addressable by said digital word, program storage means implemented by said microprocessor and responsive to sensed engine-operating parameters for calculating a desired EGR valve position and generating a computer-calculated EGR command indicative thereof, means responsive to said EGR command for generating a count indicative thereof and counter means for initially storing said count and decrementing same to produce an EGR pulse-width output signal in response thereto for selectively re-positioning said EGR valve.

2. In a microprocessor-based engine control system including a microprocessor means, memory means for storing a program for implementing at least one control law, said microprocessor being responsive to one or more engine operating parameters for normally generating fuel injection commands, the improvement comprising:

means for detecting a failure in said system and for generating a signal indicative thereof;

means responsive to said failure indicative signal for generating a series of limp home fuel control pulses sufficient to enable the vehicle to travel a short distance for repairs;

said means for generating said series of "limp home" fuel control pulses includes one-shot multivibrator means responsive to the generation of each of said engine position pulses for generating a corresponding "limp home" fuel control pulse, RC circuit means operatively coupled to said one-shot multivibrator means for determining the pulse duration of said "limp home" fuel control pulses, and pulse transmission gating means coupled to the output of said one-shot multivibrator means for receiving said "limp home" fuel control pulses whose generation is triggered by the generation of said engine position pulses, said transmission pulse gating means normally preventing said fuel injection means from receiving said "limp home" fuel control pulses but being responsive to the presence of said "fail" signal for passing said "limp home" fuel control pulses to said fuel injection means and enabling said "limp home" pulses to control the injection of fuel into said engine in spite of a failure in some portion of said microprocessor-based engine control system which might affect the reliability of said normally-generated fuel injection commands.

3. In an internal combustion engine system having an intake system, an exhaust system, an engine block, a plurality of engine cylinders disposed in said engine block, a piston disposed for a reciprocal movement within each of said plurality of cylinders, an output shaft responsive to the reciprocal movement of said pistons within said cylinders in response to the combustion of fuel therein for drivably rotating same, means for controllably supplying fuel to a selected one or more of said cylinders, sensor means associated with one or more of said pistons or said output shaft for generating engine position pulses indicative of one or more pistons having attained a predetermined reference position, said engine position pulses being generally indicative of engine speed or period, and a computer-based engine control system including computer means, memory means operatively associated with said computer means, program storage means stored within said memory means for implementing at least one fuel control law, sensor means associated with said engine for measuring a plurality of engine-operating values and generating digital words indicative of said measured values, the improvement comprising means storing at least one multi-dimensional control surface of modifier values stored in said memory means, said computer means being responsive to said program storage means for utilizing at least one of said digital words to address said memory means and interpolate between the stored values of said at least one multi-dimensional control surface to compute a modifier value functionally related to the measured value of the engine-operating parameter represented by said at least one of said digital words and for implementing said at least one fuel control law utilizing at least one of the computed modifier values for generating a fuel control command, means responsive to said fuel control commands for outputting computer-calculated fuel control pulses, said means for controllably supplying fuel to a selected one or more of said cylinders being normally responsive to said computer-calculated fuel control pulses for controlling the time and quantity of fuel supplied to said selected one or more of said cylinders, means for monitoring the normal operation of said computer means and said program means and generating a "fail" signal whenever the reliability of one or more computer-generated fuel control commands could be unreliable, means responsive to the generation of said engine position pulses for generating secondary fuel control pulses, and means responsive to the generation of said "fail" signal for terminating the control of the operation of said fuel supplying means by said computer-calculated fuel control pulses but continuing the operation of said fuel supplying means under the control of said secondary fuel control pulses so that the operation of said internal combustion engine, while degraded, is not terminated or controlled by unreliable or unsafe system commands.

4. The system of claim 3 wherein said means for generating said secondary fuel control pulses includes means for generating a single pulse for an input pulse.

5. The system of claim 4 wherein said means for generating said secondary fuel control pulses includes timing circuit means operatively coupled to said single pulse generating means for selectively controlling the pulse duration of said secondary fuel control pulses.

6. The system of claim 4 wherein said means responsive to said "fail" signal includes means normally blocking said secondary fuel control pulses but responsive to said "fail" signal for passing said secondary fuel control pulses to said fuel supplying means.

7. In an internal combustion engine having an intake system, an exhaust system, an engine block, a plurality of cylinders disposed in said engine block, a piston disposed for reciprocal movement in each of said plurality of cylinders, an output shaft responsive to the reciprocal movement of said pistons within said cylinders in response to the combustion of fuel therein for drivably rotating said output shaft, a plurality of individual sensor means associated with various portions of said engine for sensing various separate and distinct engine operating parameters such as manifold pressure, throttle position, coolant temperature, air temperature, engine speed or period, and for outputting corresponding pulse-width signals whose duration times are indicative of the measured value of said sensed parameters, signal conversion means for selectively converting a predetermined one of said pulse-width signals into a multi-bit digital word indicative thereof, computer means, memory means operatively associated with said computer means, program storage means within said memory means for execution by said computer means for implementing at least one programmed control law utilizing said multi-bit digital word indicative of the value of one of said measured engine-operating values and generating an output control command, and means responsive to said output control command for controlling at least one aspect of the operation of said internal combustion engine, the improvement wherein said program storage means includes means responsive to the execution thereof by said computer means for generating certain computer command signals, said plurality of individual sensor means being responsive to at least one of said computer command signals for initiating the conversion of measured values of engine-operating parameters into equivalent corresponding pulse-width signals and said signal conversion means being responsive to others of said certain computer command signals for programmably selecting which one of said pulse-width signals are to be converted into a multi-bit digital word at a predetermined time.

8. The engine system of claim 7 wherein said computer means samples said sensor means and is responsive to said program storage means for selectively varying the frequency of sampling of each of said individual sensor means.

9. The engine system of claim 8 wherein said signal conversion means includes a single means for both performing said pulse-width-to-binary number conversion and for temporarily storing the resulting binary number until it is sampled by said computer means thereby eliminating the need for a separate and distinct holding register.

10. In an internal combustion engine having an intake system, an exhaust system, an engine block, a plurality of engine cylinders, disposed in said engine block, a piston disposed for reciprocal movement within each of said plurality of cylinders, an output shaft responsive to the reciprocation of said pistons within said cylinders in response to the combustion of fuel therein for drivably rotating said output shaft, fuel injector means responsive to a fuel control pulse for selectively injecting a predetermined controlled quantity of fuel into one or more of said plurality of cylinders; electrically operated fuel pump means for normally supplying fuel to said fuel injector means, means responsive to an ignition control signal for controlling the ignition of said injected fuel, means for detecting a predetermined reference position of said output shaft and for generating successive periodic output shaft position pulses in response thereto, means for sensing a plurality of other engine-operating parameters such as manifold absolute pressure, throttle position, coolant temperature, air temperature, engine speed or period, or the like and for generating a sensor output signal indicative of the actual value thereof, means for converting a selected one of said sensor output signals into a digital word indicative of the value of the corresponding sensed engine-operating parameter, an improved computer-based electronic engine control system including computer means, memory means, program control means for implementing at least a predetermined fuel control law to generate a digital fuel control command signal, and means responsive to said digital fuel control command signal for controlling the time of initiation and pulse-width of said fuel control pulse for selectively operating said fuel injector means to precisely control the quantity of fuel injected into said selected one or more of said plurality of cylinders and the initiation time thereof, counter means responsive to said successively generated periodic output shaft position pulses for measuring the elapsed time therebetween, said counter means including a serial dynamic shift register and half-adder circuit means operatively coupled together for performing a binary computer-type operation while reducing the size of the surface area utilized, the cost and the required power when said counter means is implemented in an integrated circuit, control logic means coupled to at least some of the outputs of said serial dynamic shift register, said control logic means being responsive to said counter means having attained its maximum count value for enabling said half adder circuit means to terminate further incrementing of said counter means, a latching register for storing the contents of said serial dynamic shift register, means for transferring the count attained in said serial dynamic storage register into said latching register and for clearing and restarting said counter means with each successive periodic output shaft position pulse, means for detecting a serial overflow in said serial dynamic shift register for indicating an engine stall condition, and means responsive to the detection of said engine stall condition for turning off said electrically operated fuel pump means.

* * * * *